(12) United States Patent
Hanser et al.

(10) Patent No.: US 11,007,944 B1
(45) Date of Patent: May 18, 2021

(54) AUTOMATIC RAILING FOR A RETRACTABLE STAIRWAY

(71) Applicant: HWH Corporation, Moscow, IA (US)

(72) Inventors: Paul Edmund Hanser, Tipton, IA (US); Kelly Maureen Sorgenfrey, Tipton, IA (US)

(*) Notice: Subject to any disclaimer, the term of this patent is extended or adjusted under 35 U.S.C. 154(b) by 173 days.

(21) Appl. No.: 16/199,637

(22) Filed: Nov. 26, 2018

Related U.S. Application Data (60) Provisional application No. 62/590,853, filed on Nov. 27, 2017.

(51) Int. Cl.
*B60R 3/02* (2006.01)
*B60R 3/00* (2006.01)
*E04G 5/14* (2006.01)
*B60P 3/36* (2006.01)

(52) U.S. Cl.
CPC .............. *B60R 3/02* (2013.01); *B60R 3/005* (2013.01); *E04G 5/14* (2013.01); *E04G 5/142* (2013.01); *B60P 3/36* (2013.01)

(58) Field of Classification Search
CPC .......... A61G 3/06; A61G 3/067; A61G 3/068; B60R 3/02; B60R 3/005; E04G 5/14; E04G 5/142; E04H 17/04; E04H 17/06; E04H 17/062; E04H 17/066; E04H 17/068
See application file for complete search history.

(56) References Cited

U.S. PATENT DOCUMENTS

| | | | | |
|---|---|---|---|---|
| 3,713,625 A * | 1/1973 | Trudell | ............ | E04H 17/00 256/32 |
| 4,058,228 A * | 11/1977 | Hall | ............ | B60P 1/4442 414/549 |
| 4,747,243 A * | 5/1988 | Anstead | ............ | E04B 1/34336 52/182 |
| 6,102,648 A * | 8/2000 | Fretwell | ............ | A61G 3/06 14/69.5 |
| 6,179,546 B1 * | 1/2001 | Citrowske | ............ | A61G 3/06 414/543 |
| 6,601,677 B1 * | 8/2003 | Storm | ............ | B66B 9/0869 187/200 |
| 7,326,024 B2 * | 2/2008 | Cohn | ............ | B60P 1/4457 414/546 |
| 8,075,008 B1 * | 12/2011 | Hanser | ............ | B60R 3/02 280/163 |
| 8,562,279 B2 * | 10/2013 | Beck | ............ | A61G 3/067 414/546 |
| 8,893,853 B2 * | 11/2014 | Kennedy | ............ | B60R 3/002 182/84 |
| 9,403,486 B2 * | 8/2016 | May | ............ | B60R 3/005 |
| 9,435,135 B1 * | 9/2016 | Hinds | ............ | E04H 17/16 |
| 9,562,358 B2 * | 2/2017 | Lanphear | ............ | E06C 1/39 |
| 9,895,576 B1 * | 2/2018 | Orgal | ............ | A63B 24/0087 |
| 9,994,141 B1 | 6/2018 | Hanser et al. | | |

(Continued)

*Primary Examiner* — Colleen M Chavchavadze
(74) *Attorney, Agent, or Firm* — Shuttleworth & Ingersoll, PLC; Jason R. Sytsma (57) ABSTRACT

An upper rail assembly, an actuator that actuates between a retracted position and an extended position based on a signal that the platform is in one of a retracted position and an extended position with respect to the recreational vehicle, and a first drive chain combined to the actuator and connected to the upper rail assembly for moving the upper rail assembly between a retracted position and an extended position with respect to the platform is disclosed.

17 Claims, 12 Drawing Sheets

(56) References Cited

U.S. PATENT DOCUMENTS

| | | | |
|---|---|---|---|
| 10,519,014 B2 * | 12/2019 | Conway | B66F 17/006 |
| 2007/0212206 A1 * | 9/2007 | Milne | B60P 1/4471 414/545 |
| 2010/0059466 A1 * | 3/2010 | Tanner | B66F 11/04 211/134 |
| 2016/0096465 A1 * | 4/2016 | Kauffman | B60P 3/36 296/162 |
| 2018/0022262 A1 * | 1/2018 | Roth | E04F 15/02 296/162 |

* cited by examiner

Fig 3 SECTION B-B

Fig 5 SECTION D-D SCALE 1:2

CHAIN POSITIONS WHEN RAILS ARE ALL THE WAY UP

Fig 4 SECTION C-C SCALE 1:2

Fig 1

Fig 2 SECTION A-A

AUTOMATIC RAILING FOR A RETRACTABLE STAIRWAY

This Application claims priority to U.S. Provisional Patent Application No. 62/590,853 titled AUTOMATIC RAILING FOR A RETRACTABLE STAIRWAY and filed Nov. 27, 2017 the contents of which are hereby incorporated by reference herein.

This invention relates to a railing for a retractable stairway, and more specifically, this invention relates to an automatic railing for a retractable stairway.

BACKGROUND

Generally, building codes and good safety practices require railings for stairways. In the prior art, railings are put on manually after the stairway is extended. This can sometimes be a difficult process if there are variances in the rail vertical spacing and the rail receptacles spacing in the platform. What are needed are automatic rails to ensure the stairway will have a rail during use, which is automatically stored when the stairway is retracted. Automatic stairway railings could utilize a vertical cylinder to actuate a railing to this specified height. However when collapsed, the height of the mechanism will be fairly tall, making it difficult to package. Height is extremely important on over the road applications, where floor height can't be too high and mechanisms can't extend too low.

SUMMARY

This disclosure describes an automatic railing system for a retractable stairway mechanism comprising a platform and at least one stair extending from the platform on a recreational vehicle. The automatic railing system comprises of an upper rail assembly; an actuator that actuates between a retracted position and an extended position based on a signal that the platform is in one of a retracted position and an extended position with respect to the recreational vehicle; and a first drive chain combined to the actuator and connected to the upper rail assembly for moving the upper rail assembly between a retracted position and an extended position with respect to the platform.

A lower rail assembly intermittently connected to the first drive chain can be provided for extending between a retracted position and extended position. Furthermore, the first drive chain can comprise of an extended pin that engages the lower rail assembly to raise the lower rail assembly to the extended position. In one implementation, the upper rail assembly further comprises of a vertical tube and the lower rail assembly further comprises of a vertical tube, wherein the vertical tube of the upper rail assembly telescopes out of the vertical tube of the lower rail assembly. In other implementations, the upper rail assembly comprises of at least two vertical tubes and a horizontal hand rail that extends between the at least two vertical tubes.

In one implementation, the mechanism can comprise a sprocket combined to the first drive chain that is rotated by the first drive chain by at least one roller bushing, a first drive shaft that is combined to the sprocket that rotates with the sprocket, a first gear box combined to the first drive shaft that changes a plane of rotation, a second sprocket is rotated by the first gear box, a second drive chain combined to the second sprocket and combined to the other of the at least two vertical tubes to move the vertical tube between an extended position and a retracted position in synchronization with the actuator.

In another implementation, the lower rail assembly comprises of at least two vertical tubes and a horizontal hand rail that extends between the at least two vertical tubes. The second drive chain can further comprise of an extended pin that engages the other of the at least two vertical tubes of the lower rail assembly to raise the lower rail assembly to the extended position.

In another implementation, the upper rail assembly can comprise of at least three vertical tubes, a first vertical tube, a second vertical tube and a third vertical tube, and a first horizontal hand rail that extends between the first vertical tube and the second vertical tube and a second horizontal hand rail that extends between the second vertical tube and the third vertical tube. A third drive chain can be combined to the third vertical tube and a second drive shaft that extends between the first gear box and a third sprocket combined with a third drive chain to synchronize movement of the actuator with movement of the third drive chain to move the third vertical tube of the upper rail assembly in synchronization with the first vertical tube and the second vertical tube of the upper rail assembly. Furthermore, the lower rail assembly can comprise of at least three vertical tubes, a first vertical tube, a second vertical tube and a third vertical tube, and a first horizontal hand rail that extends between the first vertical tube and the second vertical tube and a second horizontal hand rail that extends between the second vertical tube and the third vertical tube. The third drive chain can comprise of an extended pin that engages the third vertical tube of the lower rail assembly to raise the lower rail assembly to the extended position.

In yet another implementation, a recreational vehicle is provided with a retractable stairway mechanism for providing stairways from a door to the recreational vehicle to the ground can comprise the a platform for moving between a retracted position underneath the door of the recreational vehicle to an extended position extended from the door of the recreational vehicle and at least one stair extending from the platform toward the ground.

In yet another implementation, the automatic railing system can comprise just an upper rail assembly and an actuator combined to the upper rail assembly for moving the upper rail assembly between a retracted position and an extended position.

These and other aspects and advantages will become apparent when the Description below is read in conjunction with the accompanying Drawings.

DETAILED DESCRIPTION

Figure 29:
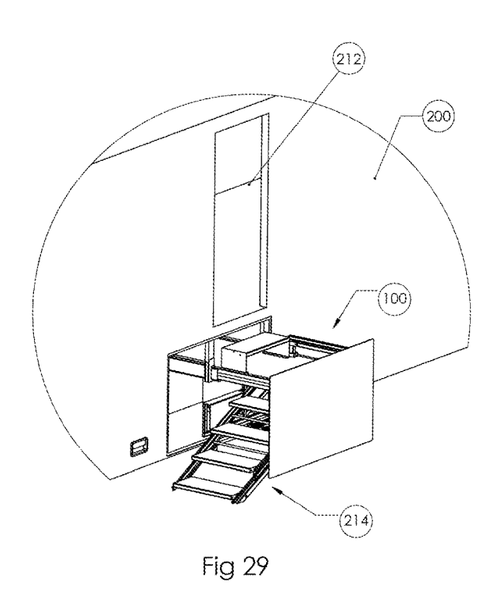
FIG. 29 is a view of the system and mechanism of FIG. 1 combined to a recreational vehicle with the platform and step extended and the upper railing and lower railing retracted.
Figure 30:
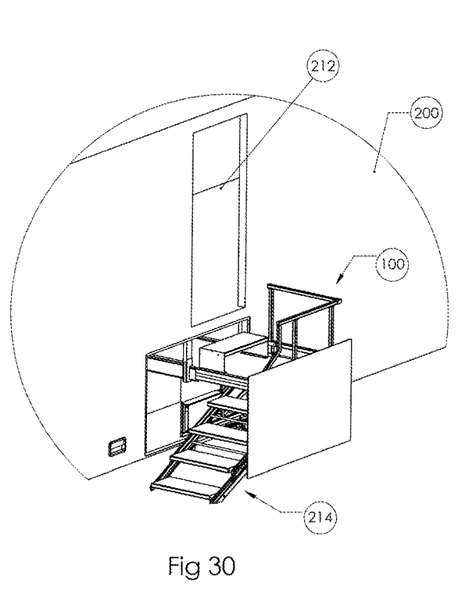
FIG. 30 is a view of the system and mechanism of FIG. 1 combined to a recreational vehicle with the platform and step extended and the upper railing extended and lower railing retracted.
Figure 31:
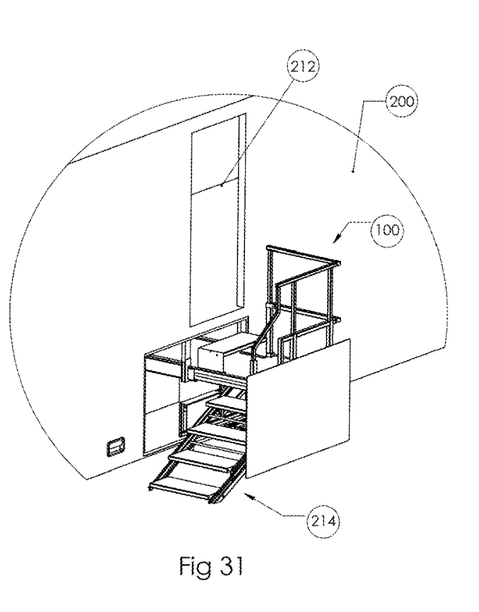
FIG. 31 is a is a view of the system and mechanism of FIG. 1 combined to a recreational vehicle with the platform and step extended and the upper railing and lower railing extended.
Figures 32, 33, 34, 37, 38:
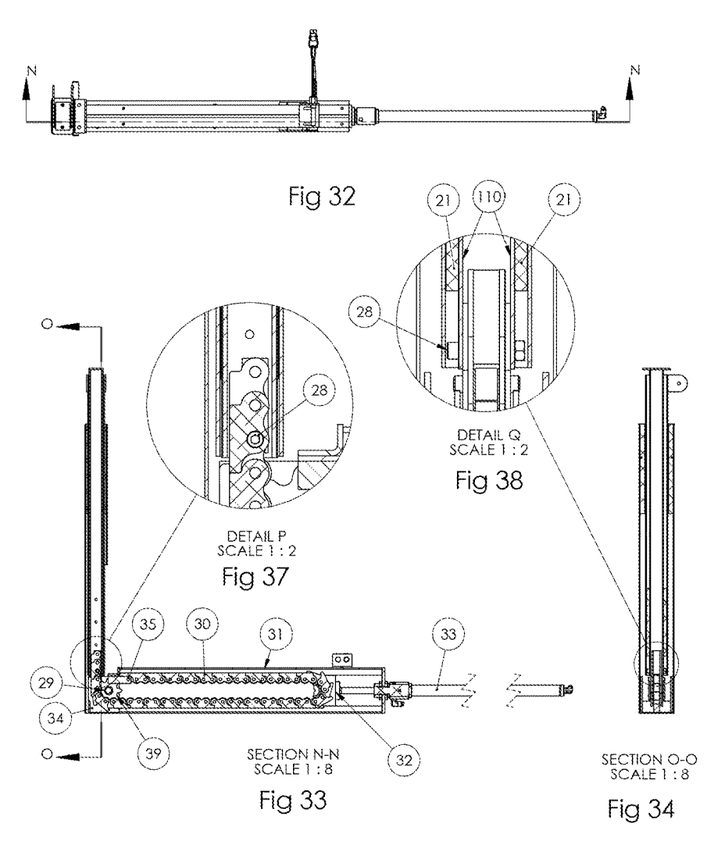
FIG. 32 is a top down view of the drive assembly with the rails retracted.
FIG. 33 is a cross section taken on the line N-N of FIG. 32.
FIG. 34 is a cross section taken on the line O-O of FIG. 33.
FIG. 37 is a detail view of an area from FIG. 33.
FIG. 38 is a detail view of an area from FIG. 34.
Figures 35, 36:
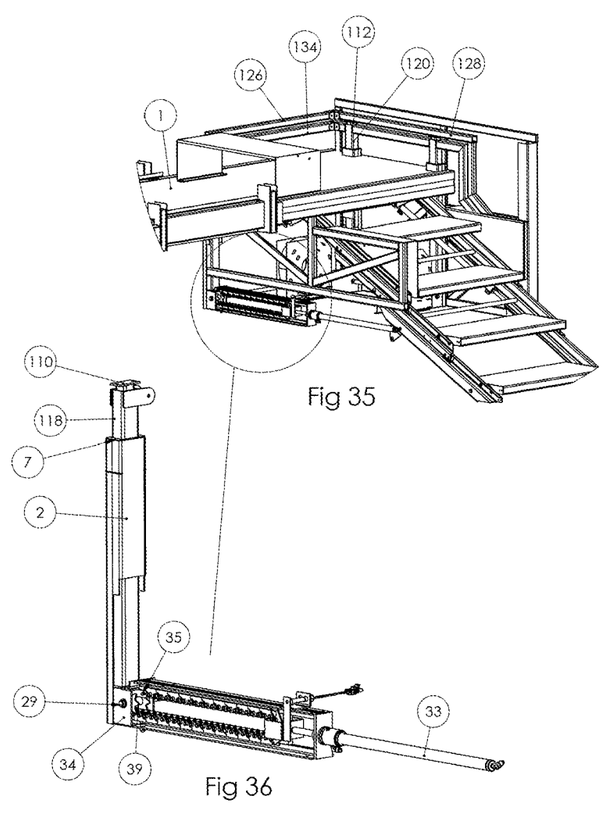
FIG. 35 is an isometric view of the system and mechanism of FIG. 1 with the rail are retracted.
FIG. 36 is a detail view of an area of FIG. 35.
Figures 39, 40, 41, 44, 45:
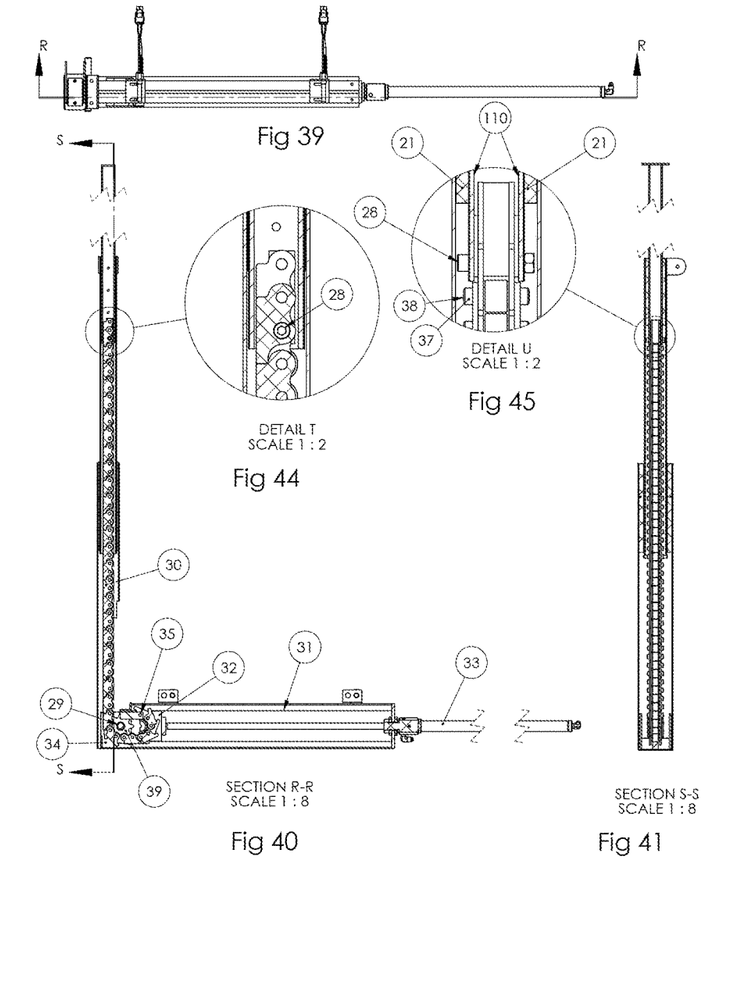
FIG. 39 is a top down view of the drive assembly with the rails extended.
FIG. 40 is cross section taken on the line R-R of FIG. 39.
FIG. 41 is a cross section taken on the line S-S of FIG. 40.
FIG. 44 is a detail view of an area of FIG. 40.
FIG. 45 is a detail view of an area of FIG. 41.
Figures 42, 43:
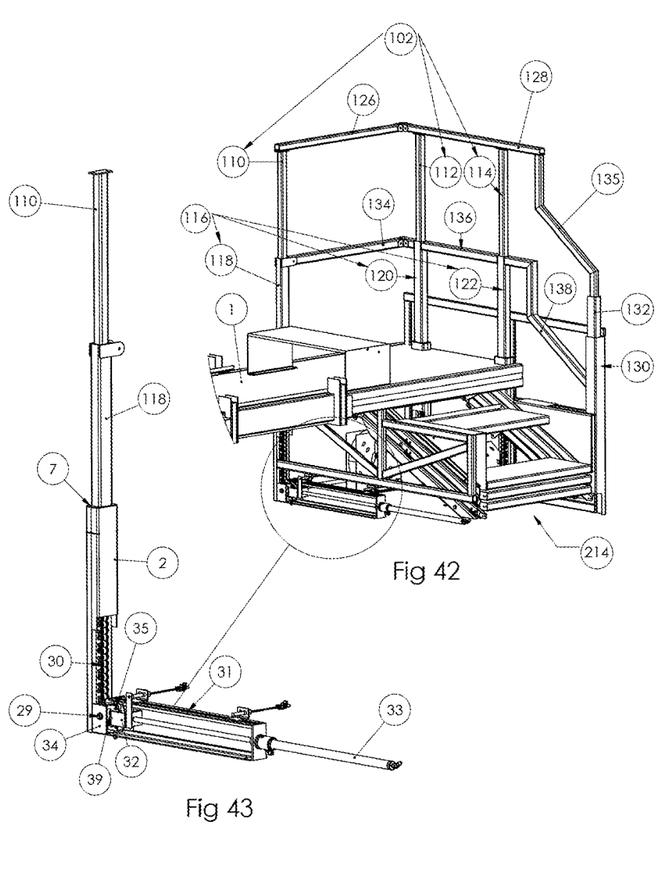
FIG. 42 is an isometric view of the system and mechanism of FIG. 1 with the rails extended.
FIG. 43 is a detail view of an area of FIG. 42.

FIGS. 29-31 illustrate in a general manner an automatic railing system 100 on a retractable stairway mechanism 210 for a recreational vehicle 200 according to this disclosure. Retractable stairway mechanism 210 can be used on any type of stairway or platform, but the one illustrated is of the type found in U.S. Pat. No. 9,994,141, the contents of which are hereby incorporated by reference herein. FIGS. 29-31 show retractable stairway mechanism 210 underneath a door 212 of an recreational vehicle 200 in various states of extension. Retractable stairway mechanism 210 comprises of a platform 1 that moves between an extended and retracted position with respect to recreational vehicle 200. A plurality of staircases 214 also move between an extended position and a retracted position with respect to platform 1.

In operation, platform 1 extends from recreational vehicle 200. Once platform 1 is fully extended, automatic railing system 100 is activated to fully extend the handrails, as described below. Staircases 214 move to the extended position after the platform is fully extended. In reverse, staircases 214 and the handrails retract, and then platform 1 is free to retract back underneath recreational vehicle 200. A specific sequence between the staircases 214 and handrails is not required.

Automatic railing system 100 comprises of an upper rail assembly 102, an actuator 33 that actuates between a retracted position and an extended position based on a signal that platform 1 is in one of a retracted position and an extended position with respect to recreational vehicle 200. A first drive chain 30 is combined to actuator 33 and to upper rail assembly 102 for moving upper rail assembly 102 between a retracted position and an extended position with respect to platform 1. The signal can be provided in any manner, including a mechanical or electrical signal from limit or proximity switches.

Figure 1:
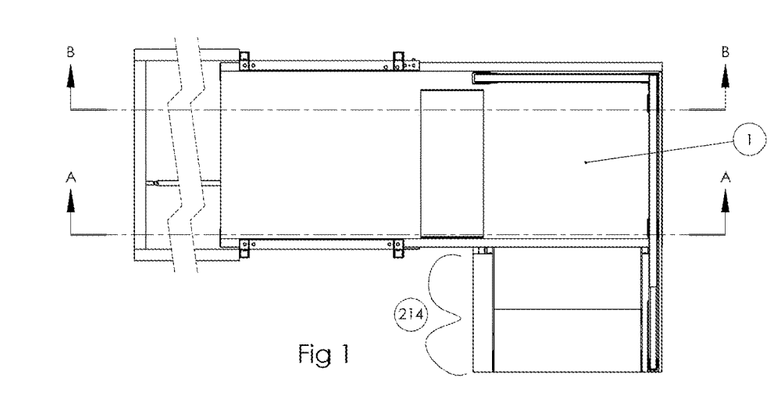
FIG. 1 is a top view of an automatic railing system on a retractable stairway mechanism according to this disclosure.
Figure 2:
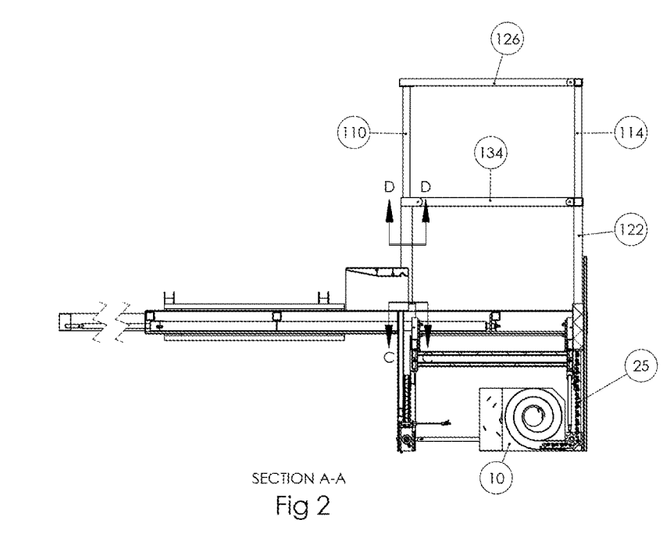
FIG. 2 is a cross section taken along the line A-A of FIG. 1 showing of one of the driven chain assembly
Figures 3, 4, 5:
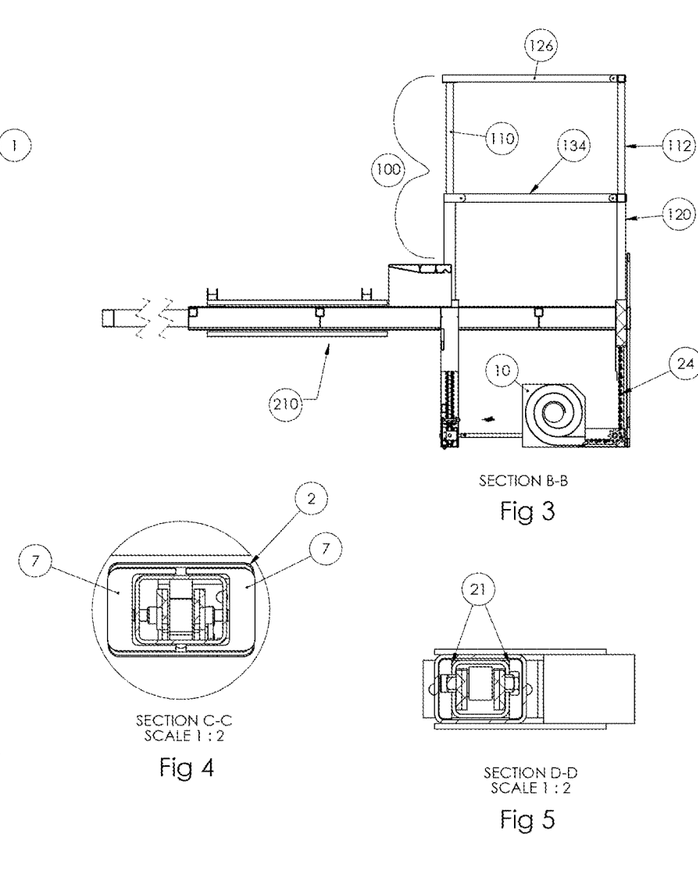
FIG. 3 is a cross section taken along the line B-B of FIG. 1 showing the other driven chain assembly on the right.
FIG. 4 is a cross section taken on the line C-C of FIG. 1 showing the guide pad arrangement with the lower rails.
FIG. 5 is a cross section taken on the line D-D of FIG. 1 showing the guide pad arrangement with the upper rails.
Figures 6, 7, 8, 9, 10:
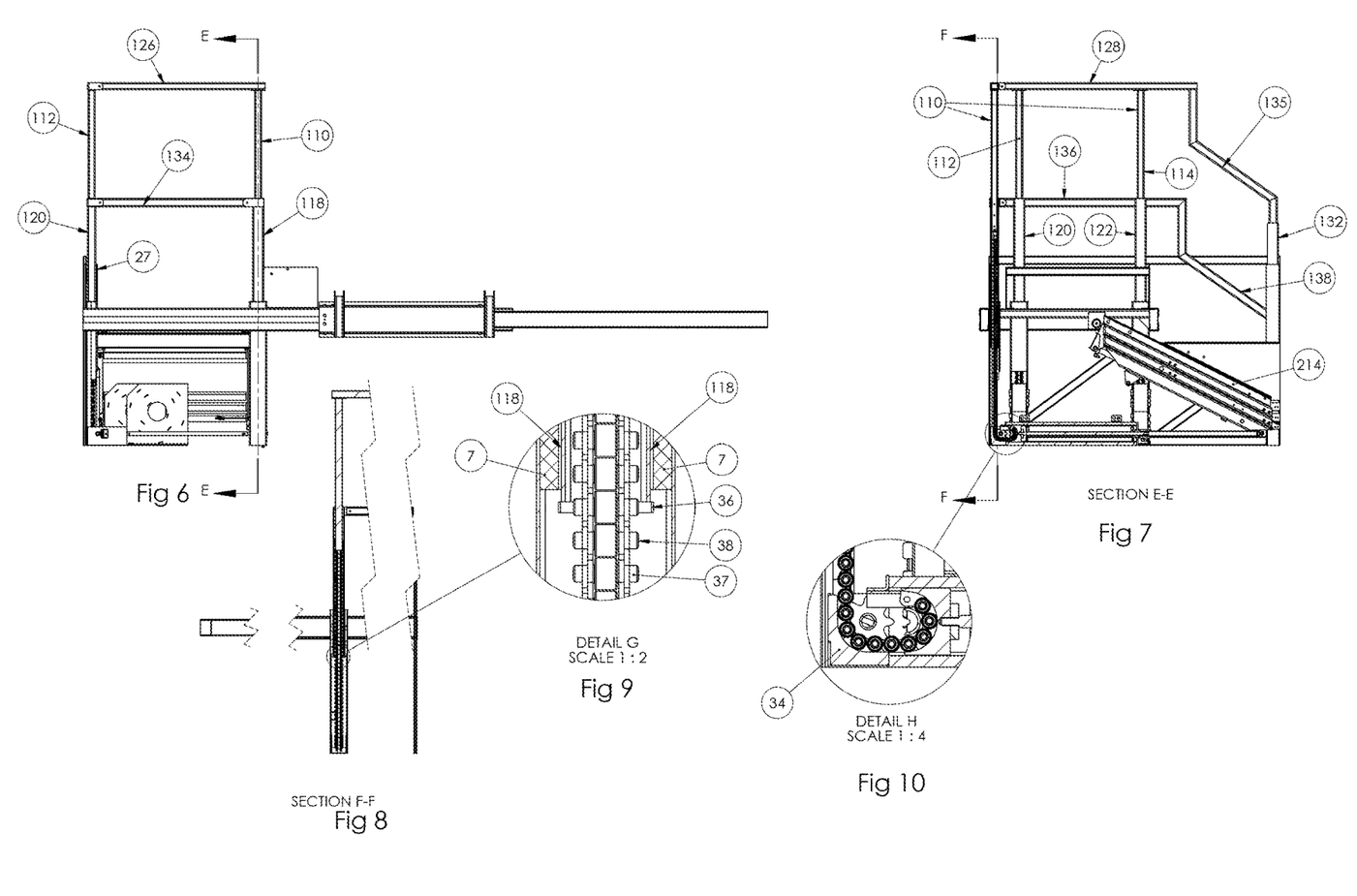
FIG. 6 is a back view of system of FIG. 1 in the extended position.
FIG. 7 is a cross section taken on the line E-E of FIG. 6 showing the drive chain and drive mechanism.
FIG. 8 is a cross section taken on the line F-F of FIG. 6 showing the drive chain and rail assembly.
FIG. 9 is a detail view of an area in FIG. 8 of the drive chain.
FIG. 10 is a detail and cross section view of an area of FIG. 7 showing the drive sprocket housing.
Figure 11:
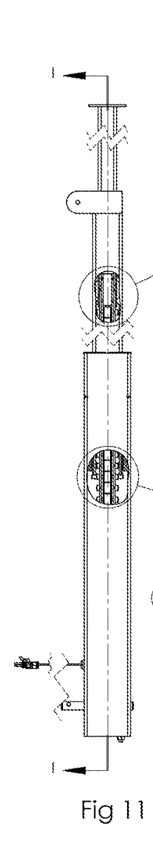
FIG. 11 is an end view of the drive chain and rail.
Figures 12, 15, 16:
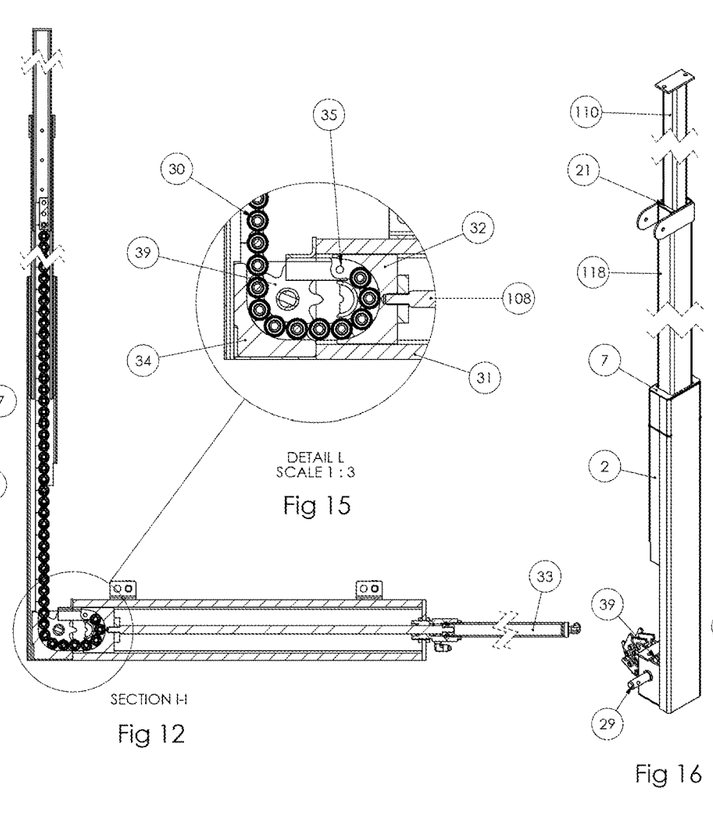
FIG. 12 is a cross section taken on the line I-I of FIG. 11 showing the drive chain, rail, and actuator assembly.
FIG. 15 is a detail of an area of FIG. 12.
FIG. 16 is a view of the vertical rails in the extended position and sprocket housing. T
Figures 21, 22:
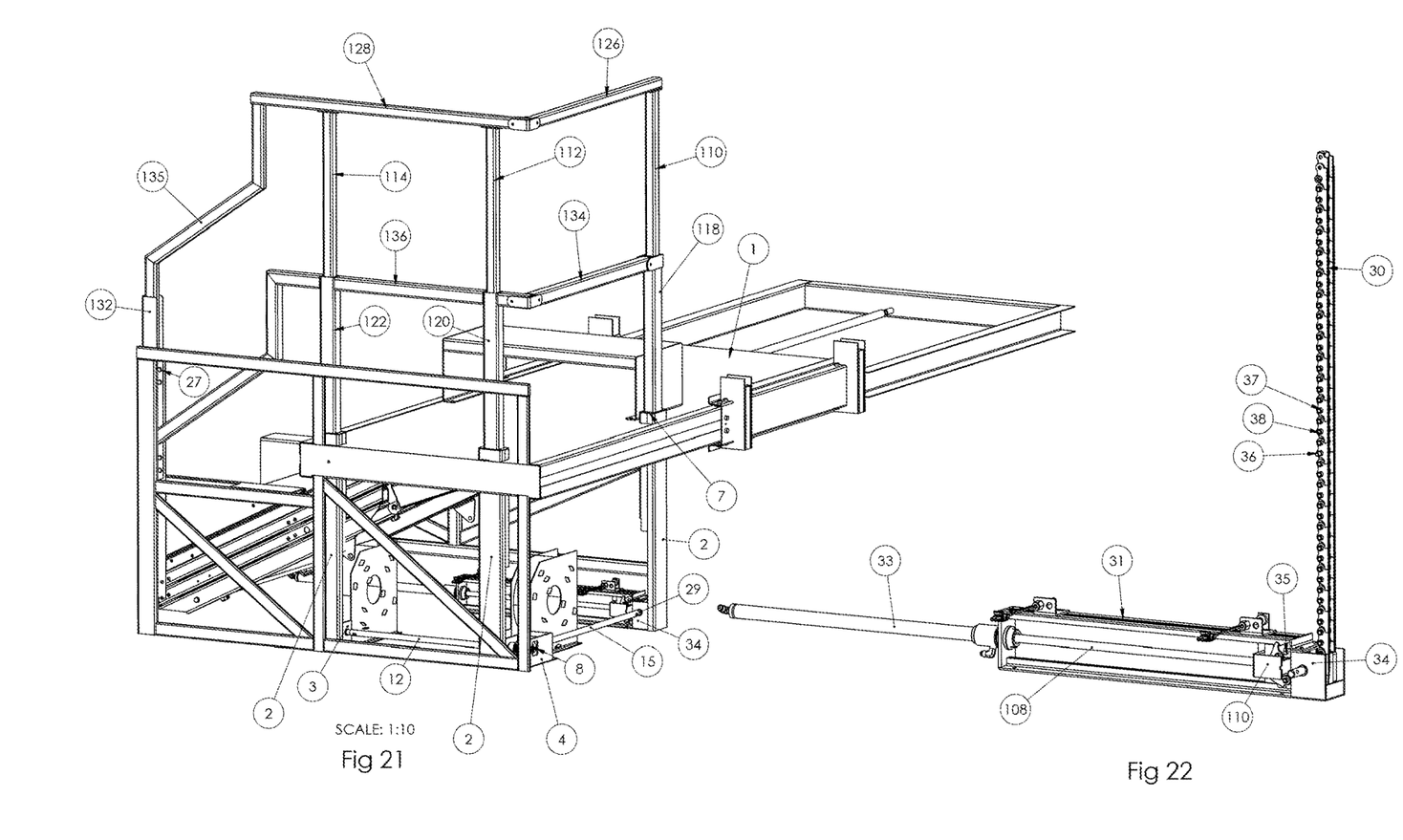
FIG. 21 is an isometric view of the system and mechanism of FIG. 1 with the rails in the extended position.
FIG. 22 is an isometric view of the drive chain mechanism.
Figure 23:
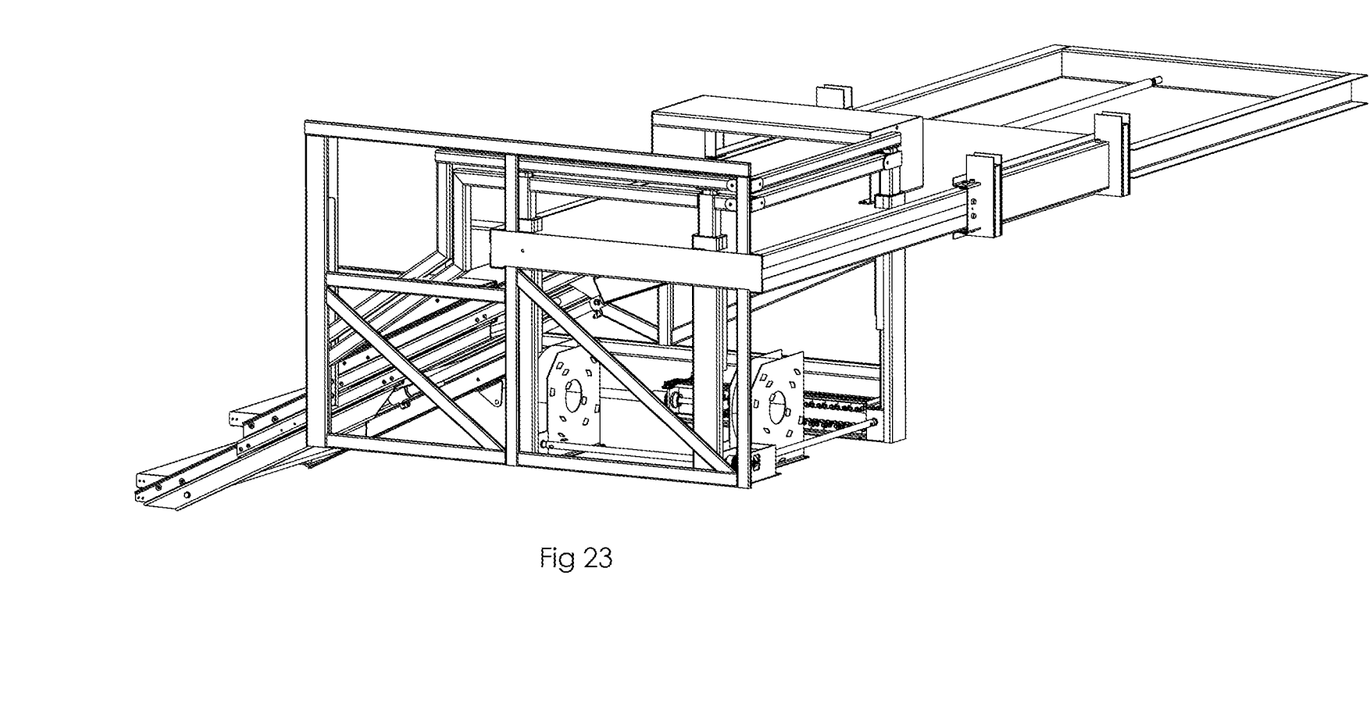
FIG. 23 is an isometric rear view of the system and mechanism of FIG. 1 with the rails in the retracted position and the platform and steps in the extended position.
Figure 24:
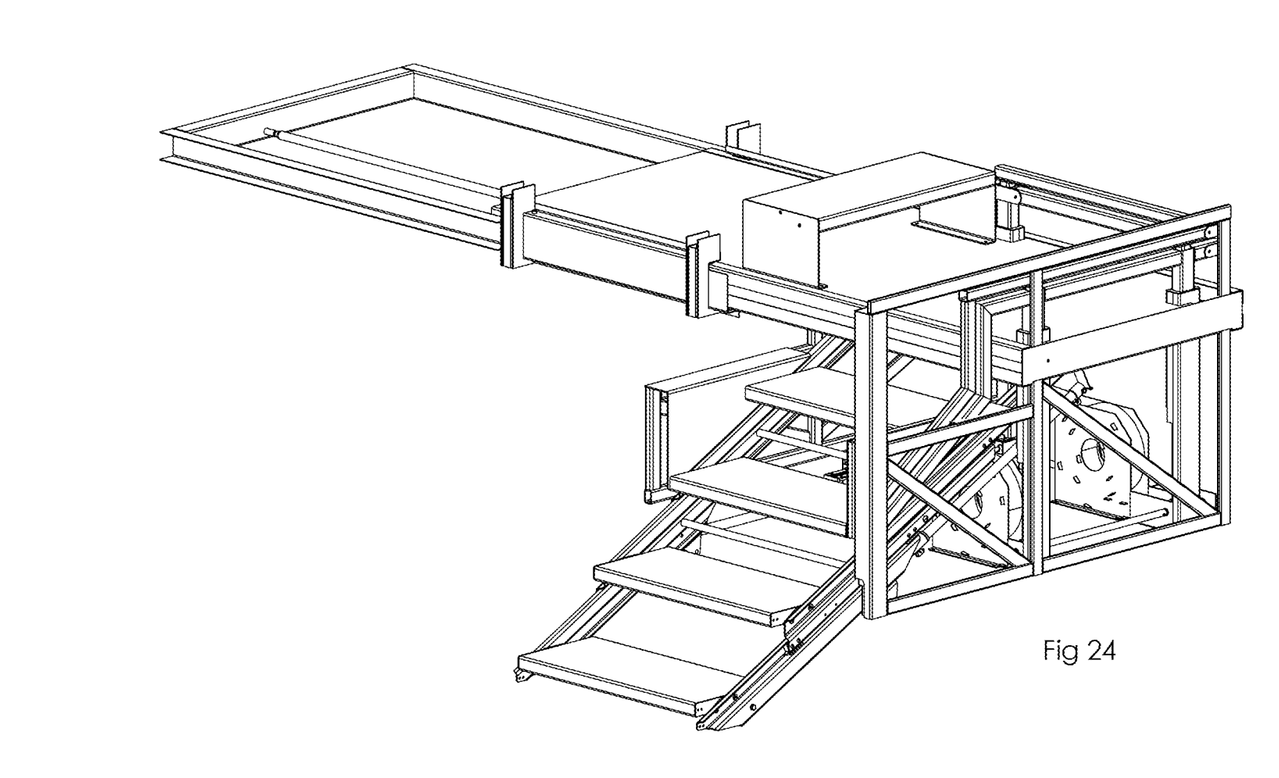
FIG. 24 is an isometric front view of the system and mechanism of FIG. 1 with the rails in the retracted position and the platform and steps are in the extended position.

More specifically, FIGS. 15 and 22 show actuator 33 with a rod 108 that is combined to a carriage 32 that moves about a track 31. First drive chain 30 is combined to track 31 by pin 35 so that extension and retraction of rod 108 of actuator 33 moves carriage 32 and first drive chain 30 between the extended position and the retracted position. At the end of track 31 is a housing 34 that redirects first drive chain 30 vertically upward. The outer extent of first drive chain 30 is connected to a first vertical tube 110 by a connection fastener 28 (shown in detail in FIG. 13). In this way, actuation of actuator 33 moves first drive chain 30 and thus first vertical tube 110 of upper rail assembly 102 between an extended position and a retracted position.

Figure 14:
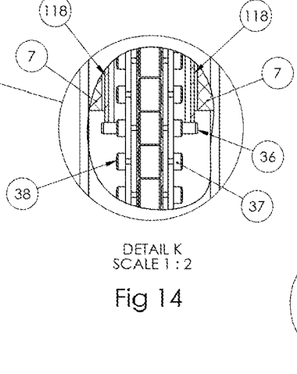
FIG. 14 is a detail of an area of FIG. 11
Figure 20:
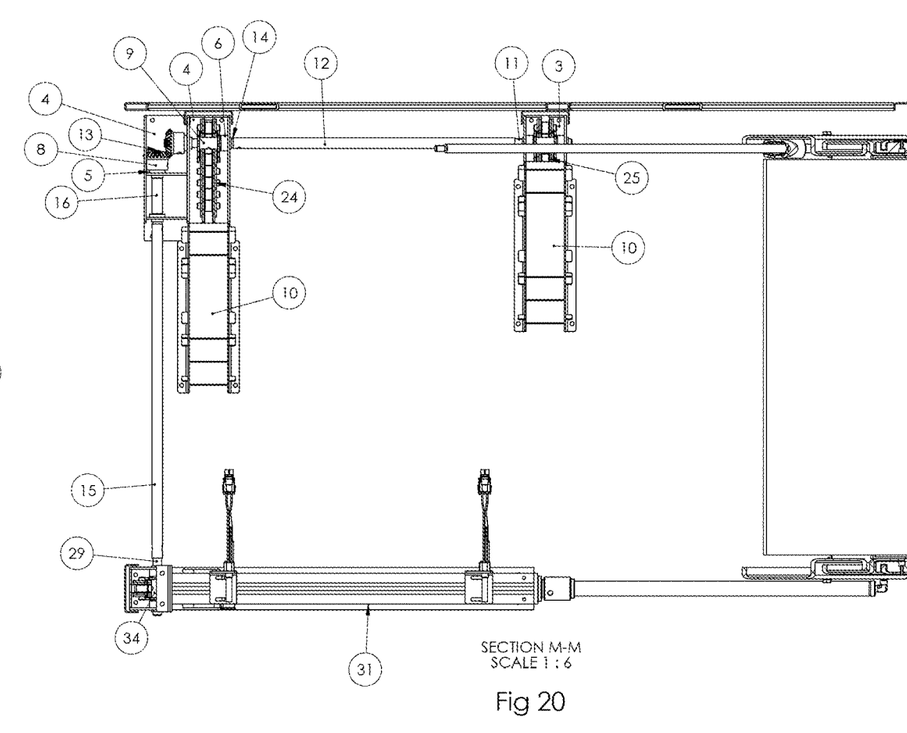
FIG. 20 is a top view cross section taken on the line M-M of FIG. 19.

Returning to housing 34, housing 34 contains a drive sprocket 39 that cooperates with the track in the housing to redirect first drive chain 30 vertically upward. Referring to FIG. 14, roller bushings 37 are attached to drive chain 30 by pins 38. Roller bushings 37 engage the teeth of the drive sprocket 39, causing drive sprocket 39 to rotate as drive chain 30 is actuated. Drive sprocket 39, as shown in FIG. 20, is combined to a drive shaft 29 that extends across platform 1 in tube 15 to a miter gear box 4. The end of drive shaft 13 is connected by a sleeve 16 and a bushing 5 to one side of a bevel gear pair 8 in miter gear box 4. The other side of bevel gear pair 8 is combined to another drive shaft 14 that extends perpendicular to drive shaft 29. In this regard, miter gear box 4 changes a plane of rotation of drive shaft 29 and drive shaft 14.

Drive shaft 14 is combined to a second drive chain 24 and a third drive chain 25, which function much like first drive chain 30. A second sprocket box comprising a bushing 6 around drive shaft 14 which is combined to a sprocket that is engaged with second drive chain 24 inside a second housing. One end of second drive chain 24 slides about inside a chain housing 10. The other end of second drive chain 24 is combined by a fastener connection to a second vertical tube 112.

Drive shaft 14 extends parallel to track 31 for first drive chain 30 to a third sprocket box 3 that similarly comprises of a bushing 6 around drive shaft 11 which is combined to a sprocket that is engaged with third drive chain 25 inside a third housing. One end of third drive chain 25 slides about inside the third housing 10. The other end of third drive chain 25 is combined by a fastener connection to a third vertical tube 114.

The foregoing arrangement directly and synchronously combines actuator 33 with first drive chain 30, second drive chain 24, and third drive chain 25 to move the first vertical tube 110, second vertical tube 112, and third vertical tube 114 of upper rail assembly 102 of automatic railing system 100 between retracted and extended positions.

Figure 13:
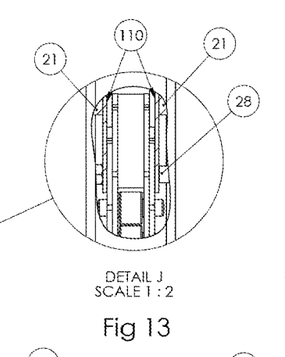
FIG. 13 is a detail of an area of FIG. 11 showing pad arrangement between the upper and lower rail.
Figures 17, 18:
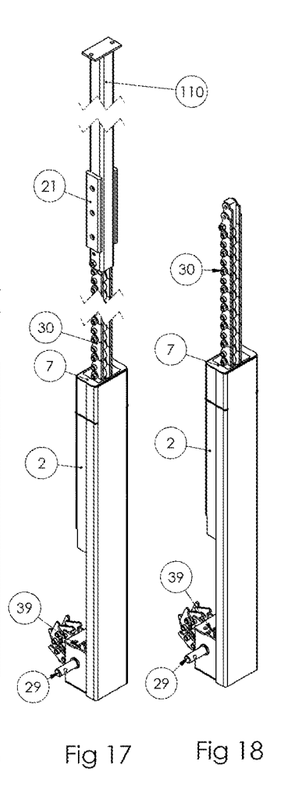
FIG. 17 is a view of the vertical rails in the extended position minus the lower rail assembly.
FIG. 18 is a view of the vertical rails in the extended position minus the lower rail assembly and upper rail assembly.
Figure 19:
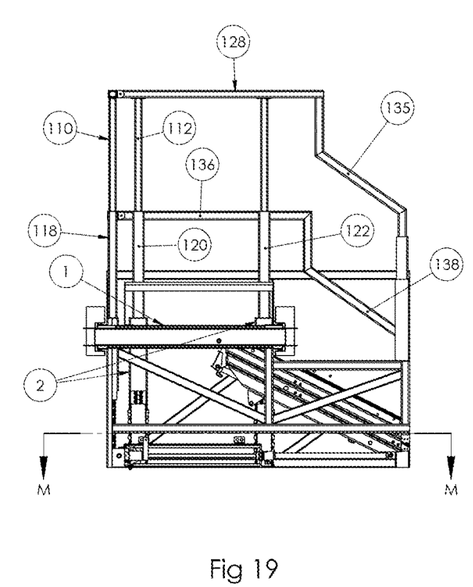
FIG. 19 is a side view of the system and mechanism of FIG. 1 in the extended position.

FIGS. 16-18 shows the extension of first vertical tube 110 of upper rail assembly 102. Second vertical tube 112 and third vertical tube 114 functions the same way with similar components, so for simplicity only the extension of first vertical tube 110 will be described. Briefly, however, it is important to recognize that a lower rail assembly 116 comprising a first vertical tube 118, a second vertical tube 120, and a third vertical tube 122 is also provided, which can be seen in FIG. 21. Turning back to FIGS. 16-18, a rail guide 2 is shown. At the bottom of rail guide 2 is the sprocket box for first drive chain 30. First vertical tube 118 of lower rail assembly 116 telescopically slides in and out of rail guide 2. Similarly, first vertical tube 110 of upper rail assembly 102 telescopically slides in and out of first vertical tube 118 of lower rail assembly 116. Turning briefly to FIG. 13, a pair of wear pads 21 are attached to the outer sides of each first vertical tube 110 of upper rail assembly 102 and, looking at FIG. 14, a pair of wear pads 7 are attached to the inner sides rail guide 2 so that there is smooth reduced friction surface upon which first vertical tube 110 of upper rail assembly 102 and first vertical tube 118 of lower rail assembly 116 to slide.

As previously stated, first drive chain 30 is directly connected to first vertical tube 110 of upper rail assembly 102, as shown in FIG. 13. As actuator 33 extends its rod outward, the rod drives carriage 32 and pushes first drive chain 30 around drive sprocket 39 upward. An extended pin 36 in place of one of chain pins 38 of first drive chain 30. As first drive chain 30 moves upward, eventually extended pin 36 engages the bottom of first vertical tube 118 of lower rail assembly 116 to push upward first vertical tube 118 of lower rail assembly 116, as shown in FIG. 14. In this regard, first vertical tube 118 of lower rail assembly 116 is only intermittently connected to first drive chain 30 for extending first vertical tube 118 of lower rail assembly 116 between the retracted position and extended position.

Figure 25:
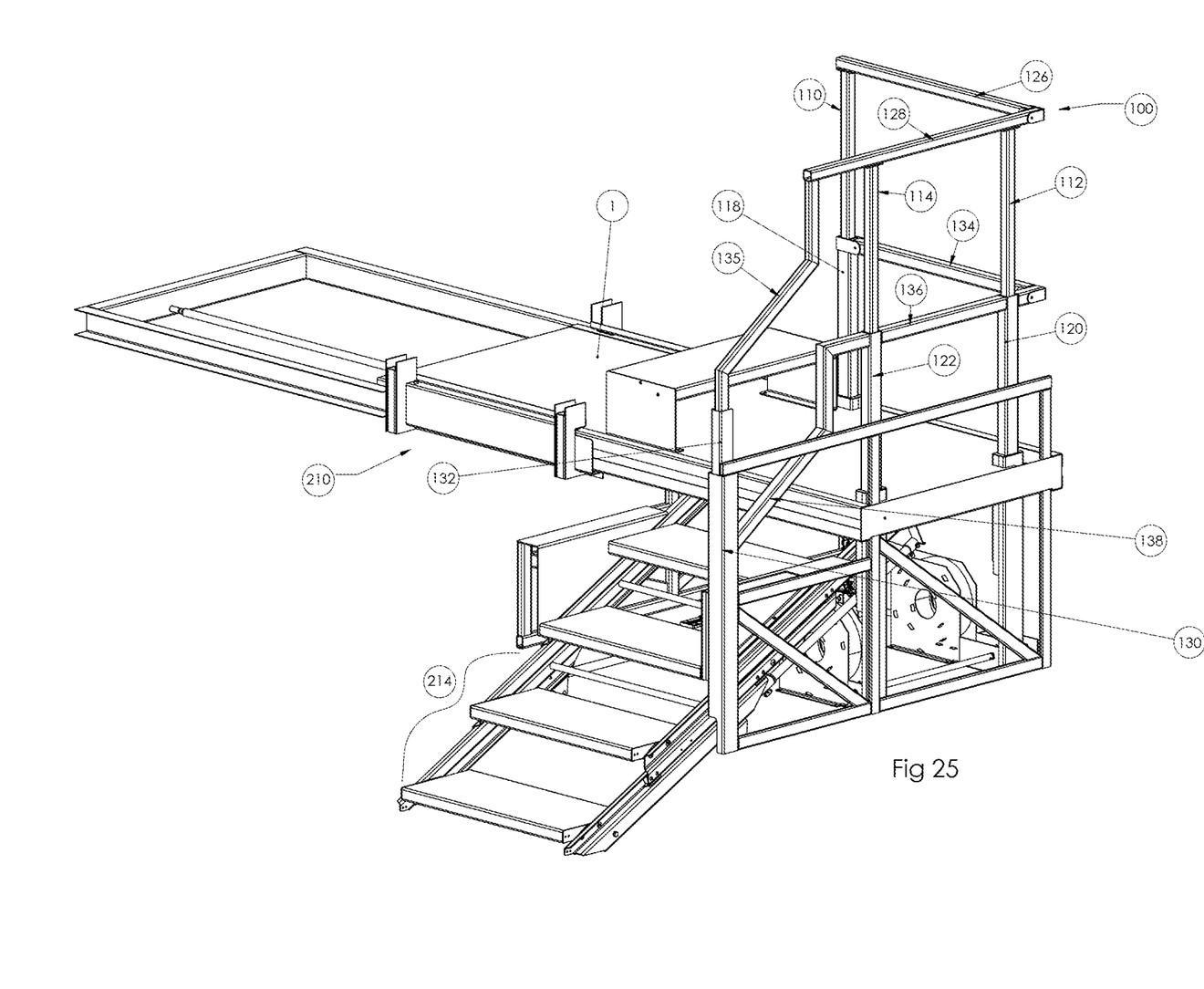
FIG. 25 is an isometric rear view of the system and mechanism of FIG. 1 with the rails in the extended position and the platform and steps are in the extended position.
Figures 26, 27, 28:
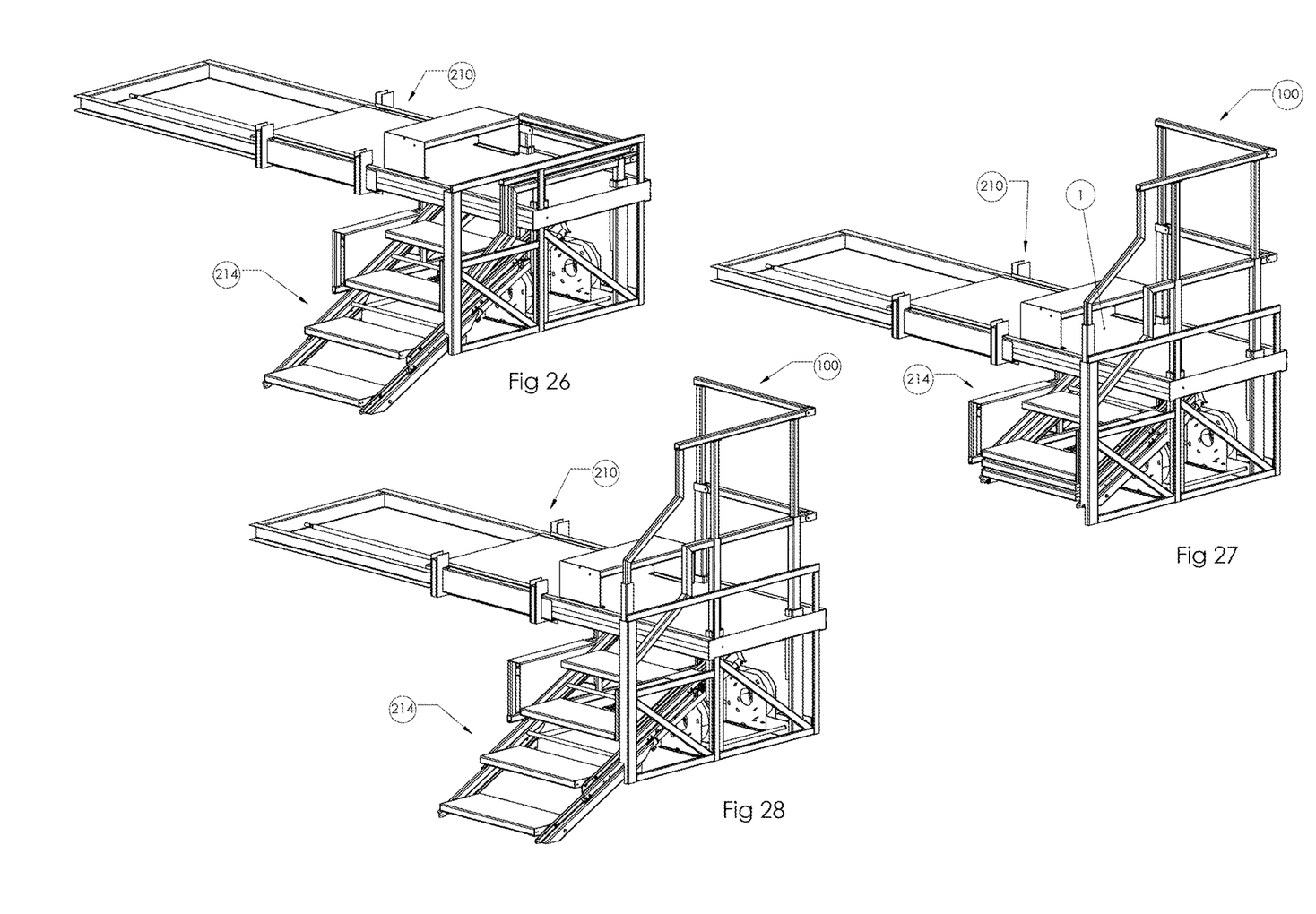
FIG. 26 is an isometric front view of the system and mechanism of FIG. 1 with the rails in the retracted position and the platform and steps are in the extended position.
FIG. 27 is an isometric front view of the system and mechanism of FIG. 1 with the rails in the extended position and the platform extended with the steps retracted.
FIG. 28 is an isometric front view of the system and mechanism of FIG. 1 with the rails, step, and platform in the extended position.

FIGS. 24-31 shows automatic railing system 100 in various states of extension. FIG. 25 shows retractable stairway mechanism 210 with staircases 214, and automatic railing system 100 fully extended. Upper rail assembly 102 comprises first vertical tube 110, second vertical tube 112, and third vertical tube 114. A first horizontal hand rail 126 extends between first vertical tube 110 and second vertical tube 112. A second horizontal hand rail 128 extends between second vertical tube 112 and third vertical tube 114. First horizontal hand rail 126 and second horizontal hand rail 128 provide a rigid handle to which a person can grab onto when standing on platform 1 or ascending or descending staircases 214 of retractable stairway mechanism 210. A passive guide rail 130 with a telescoping inner tube 132 combined at its top with a first angled handrail 135 that extends to second horizontal hand rail 128 can also be provided to extend the handrail down the horizontal length of staircase 214. While telescoping inner tube 132 can be synchronously driven in the same manner as second vertical tube 112 and third vertical tube 114, the illustrated embodiment shows that it moves between the extended and retracted positions due to its connection via first angled handrail 135 to second horizontal hand rail 128 and third vertical tube 114.

Lower rail assembly 116 comprises of a first vertical tube 118, a second vertical tube 120, and a third vertical tube 122. A first horizontal hand rail 134 can extend between first vertical tube 118 and second vertical tube 120. A second horizontal hand rail 136 can extend between second vertical tube 120 and third vertical tube 122. First horizontal hand rail 134 and second horizontal hand rail 136 provide extra rigidity to automatic railing system 100. A second angled handrail 138 can extend from second horizontal hand rail 136 to passive guide rail 130 to extend lower rail assembly 116 outward with staircases 214.

While the present invention has been particularly shown and described with reference to exemplary embodiments thereof, it should be understood by those of ordinary skill in the art that various changes, substitutions and alterations can be made herein without departing from the scope of the invention as defined by appended claims and their equivalents.

What is claimed is:

1. An automatic railing system for a retractable stairway mechanism comprising a platform and at least one stair extending from the platform on a recreational vehicle, the automatic railing system comprising:
   an upper rail assembly;
   an actuator that actuates between a retracted position and an extended position based on a signal that the platform is in one of a retracted position and an extended position with respect to the recreational vehicle; and
   a first drive chain connected to the actuator and connected to the upper rail assembly for moving the upper rail assembly between a retracted position and an extended position with respect to the platform.

2. The automatic railing system of claim 1, and further comprising a lower rail assembly intermittently connected to the first drive chain for extending between a retracted position and extended position.

3. The automatic railing system of claim 2, wherein the first drive chain further comprises an extended pin that engages the lower rail assembly to raise the lower rail assembly to the extended position.

4. The automatic railing system of claim 3, wherein the upper rail assembly further comprises of a first vertical tube and the lower rail assembly further comprises of a first vertical tube, wherein the first vertical tube of the upper rail assembly telescopes out of the first vertical tube of the lower rail assembly.

5. The automatic railing system of claim 4, wherein the upper rail assembly comprises of the first vertical tube and a second vertical tube and a horizontal hand rail that extends between the first vertical tube and the second vertical tube.

6. The automatic railing system of claim 5, and further comprising a sprocket combined to the first drive chain that is rotated by the first drive chain by at least one roller bushing, a first drive shaft that is combined to the sprocket that rotates with the sprocket, a first gear box combined to the first drive shaft that changes a plane of rotation, a second sprocket is rotated by the first gear box, a second drive chain combined to the second sprocket and combined to the other of the at least two vertical tubes to move the vertical tube between an extended position and a retracted position in synchronization with the actuator.

7. The automatic railing system of claim 6, wherein the lower rail assembly comprises of at least two vertical tubes and a horizontal hand rail that extends between the at least two vertical tubes.

8. The automatic railing system of claim 7, wherein the second drive chain further comprises of an extended pin that engages the other of the at least two vertical tubes of the lower rail assembly to raise the lower rail assembly to the extended position.

9. The automatic railing system of claim 8, wherein the upper rail assembly comprises of the first vertical tube, the second vertical tube and a third vertical tube, and a first horizontal hand rail that extends between the first vertical tube and the second vertical tube and a second horizontal hand rail that extends between the second vertical tube and the third vertical tube.

10. The automatic railing system of claim 9, and further comprising a third drive chain combined to the third vertical tube and a second drive shaft that extends between the first gear box and a third sprocket combined with a third drive chain to synchronize movement of the actuator with movement of the third drive chain to move the third vertical tube of the upper rail assembly in synchronization with the first vertical tube and the second vertical tube of the upper rail assembly.

11. The automatic railing system of claim 10, wherein the lower rail assembly comprises of a first vertical tube, a second vertical tube and a third vertical tube, and a first horizontal hand rail that extends between the first vertical tube and the second vertical tube and a second horizontal hand rail that extends between the second vertical tube and the third vertical tube.

12. The automatic railing system of claim 11, wherein the third drive chain further comprises of an extended pin that engages the third vertical tube of the lower rail assembly to raise the lower rail assembly to the extended position.

13. A recreational vehicle comprising:
a retractable stairway mechanism for providing stairways from a door to the recreational vehicle to the ground comprising a platform for moving between a retracted position underneath the door of the recreational vehicle to an extended position extended from the door of the recreational vehicle and at least one stair extending from the platform toward the ground; and
an automatic railing system for the retractable stairway mechanism comprising,
an upper rail assembly,
an actuator that actuates between a retracted position and an extended position based on a signal that the platform is in one of a retracted position and an extended position with respect to the recreational vehicle, and
a first drive chain connected to the actuator and connected to the upper rail assembly for moving the upper rail assembly between a retracted position and an extended position with respect to the platform.

14. The recreational vehicle of claim 13, and further comprising a lower rail assembly intermittently connected to the first drive chain for extending between a retracted position and extended position.

15. The recreational vehicle of claim 14, wherein the first drive chain further comprises an extended pin that engages the lower rail assembly to raise the lower rail assembly to the extended position.

16. The recreational vehicle of claim 15, wherein the upper rail assembly further comprises of a vertical tube and the lower rail assembly further comprises of a vertical tube, wherein the vertical tube of the upper rail assembly telescopes out of the vertical tube of the lower rail assembly; and at least two vertical tubes and a horizontal hand rail that extends between the at least two vertical tubes.

17. An automatic railing system for a retractable stairway mechanism comprising a platform and at least one stair extending from the platform on a recreational vehicle, the automatic railing system comprising:
an upper rail assembly; and
an actuator connected to the upper rail assembly for moving the upper rail assembly between a retracted position and an extended position;
wherein the upper rail assembly comprises of a first vertical tube, a second vertical tube and a third vertical tube, and a first horizontal hand rail that extends between the first vertical tube and the second vertical tube and a second horizontal hand rail that extends between the second vertical tube and the third vertical tube;
a first drive chain comprising an extended pin and connected between the actuator and the upper rail assembly for moving the upper rail assembly between a retracted position and an extended position with respect to the platform; and
a lower rail assembly intermittently connected to the first drive chain by the extended pin for extending between a retracted position and extended position.

* * * * *